US009516488B2

(12) United States Patent
Wu et al.

(10) Patent No.: US 9,516,488 B2
(45) Date of Patent: Dec. 6, 2016

(54) METHOD, APPARATUS AND SYSTEM FOR D2D COMMUNICATION

(71) Applicant: ZTE CORPORATION, Shenzhen, Guangdong Province (CN)

(72) Inventors: Shuanshuan Wu, Shenzhen (CN); Feng Liang, Shenzhen (CN); Ming Yuan, Shenzhen (CN); Jin Yang, Shenzhen (CN); Yifei Yuan, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/424,838

(22) PCT Filed: Aug. 28, 2013

(86) PCT No.: PCT/CN2013/082467
§ 371 (c)(1),
(2) Date: Feb. 27, 2015

(87) PCT Pub. No.: WO2014/032592
PCT Pub. Date: Mar. 6, 2014

(65) Prior Publication Data
US 2015/0245192 A1    Aug. 27, 2015

(30) Foreign Application Priority Data

Aug. 31, 2012  (CN) .......................... 2012 1 0319311

(51) Int. Cl.
*H04W 8/00*         (2009.01)
*H04W 68/00*        (2009.01)
(Continued)

(52) U.S. Cl.
CPC ............. *H04W 8/005* (2013.01); *H04W 68/00* (2013.01); *H04W 72/0446* (2013.01); *H04W 76/02* (2013.01); *H04W 76/023* (2013.01)

(58) Field of Classification Search
CPC ...... H04W 8/005; H04W 76/02; H04W 68/00; H04W 72/0446
See application file for complete search history.

(56) References Cited

U.S. PATENT DOCUMENTS

2011/0258313 A1    10/2011   Mallik
2014/0286284 A1*   9/2014    Lim ........................ H04L 5/003
                                                      370/329

(Continued)

FOREIGN PATENT DOCUMENTS

CN      102647246        8/2012
CN      103108405        5/2013

(Continued)

OTHER PUBLICATIONS

International Search Report for International Application No. PCT/CN2013/082467 mailed Dec. 28, 2013.

(Continued)

*Primary Examiner* — Albert T Chou
(74) *Attorney, Agent, or Firm* — McAndrews, Held & Malloy, Ltd

(57) ABSTRACT

Method, apparatus and system for D2D communication are provided. The method includes: a first user equipment receives configuration message(s) from a network, wherein the configuration information about D2D discovery signal(s) is carried in the configuration message(s); the first user equipment detects D2D discovery signal(s) from a second user equipment according to the configuration information carried in the configuration message(s); the first user equipment transmits a request message to the network according to the result of the detection to acquire the identity of the second user equipment transmitting the detected D2D discovery signal; and the first user equipment receives a response message returned from the network, wherein the identity of the second user equipment or rejection informa- (Continued)

tion indicating the rejection to the discovery of the second user equipment by the first user equipment is carried in the response message. The present disclosure addresses the problem of the peer discovery of D2D incorporated in a cellular communication system.

19 Claims, 9 Drawing Sheets

(51) Int. Cl.
*H04W 72/04* (2009.01)
*H04W 76/02* (2009.01)

(56) References Cited

U.S. PATENT DOCUMENTS

| | | | | |
|---|---|---|---|---|
| 2014/0342747 | A1* | 11/2014 | Lee | H04L 5/0053 455/450 |
| 2015/0296443 | A1* | 10/2015 | Lim | H04W 48/12 370/312 |
| 2015/0327046 | A1* | 11/2015 | Lee | H04W 56/002 370/338 |

FOREIGN PATENT DOCUMENTS

| | | |
|---|---|---|
| CN | 103250435 | 8/2013 |
| WO | WO2010/028690 | 3/2010 |
| WO | 2011/130630 | 10/2011 |

OTHER PUBLICATIONS

Supplementary European Search Report mailed Mar. 21, 2016 corresponding to European Patent Application No. EP 13 83 3362.
"LTE Release 12 and Beyond", 5 3GPP Draft; RWS-120003 LTE Release 12 and Beyond, 3rd Generation Partnership Project (3GPP), Mobile Competence Centre; 650, Route Des Lucioles ; F-06921 Sophia-Antipolis Cedex; France, No. Ljubljana, Slovenia; 20120611-20120612, Jun. 1, 2012, XP050655092, Retrieved from the Internet: URL:http://www.3gpp.org/ftp/workshop/2012-06-11 12 RAN REL12/Docs/ [retrieved on Jun. 1, 2012].
GA Bor Fodor et al: "Design aspects of 1-16 network assisted device-to-device communications", IEEE Communications Magazine, IEEE Service Center, Piscataway, US, vol. 50, No. 3, Mar. 1, 2012, pp. 170-177, XP011429640.
ZTE: "Discussion of D2D Discovery", 3GPP Draft; RI-133149 D2D Discovery, 3rd Generation Partnership Project (3GPP), Mobile Competence Centre; 650, Route Des Lucioles ; F-06921 Sophia-Antipolis Cedex ; France, vol. RAN WGI, No. Barcelona, Spain; 20130819-20130823, Aug. 10, 2013, XP050716361, Retrieved from the Internet: URL:http://www.3gpp.org/ftp/tsg ran/WGI RL I/TSGRI 74/Docs/—[retrieved on Aug. 10, 2013].

\* cited by examiner

METHOD, APPARATUS AND SYSTEM FOR D2D COMMUNICATION

CROSS-REFERENCE TO RELATED APPLICATIONS/INCORPORATION BY REFERENCE

This application is a 371 of International Patent Application No. PCT/CN2013/082467, filed Aug. 28, 2013, entitled "COMMUNICATION METHOD, DEVICE AND SYSTEM FOR DEVICE TO DEVICE COMMUNICATION SYSTEM", which claims priority to Chinese Patent Application No. 201210319311.5, filed Aug. 31, 2012, entitled "COMMUNICATION METHOD AND DEVICE OF DEVICE-TO-DEVICE COMMUNICATION SYSTEM AND SYSTEM". The above-identified applications are hereby incorporated herein by reference in their entirety.

FIELD OF THE INVENTION

The present disclosure relates to the communication field and more particularly to method, apparatus and system for device-to-device (D2D) communication.

BACKGROUND OF THE INVENTION

In a cellular communication system, when there are services to be transmitted between two User Equipments (UEs), service data to be transmitted from a UE1 to a UE2 is first transmitted to the base station (or referred to as a Node B or an evolved Node B or an enhanced Node B, NB or eNB for short) of the cell where the UE1 is located via an air interface, then the base station transmits the user data to the base station of the cell where the UE2 is located via a core network, and the base station of the cell where the UE2 is located transmits the service data to the UE2 via an air interface. The service data transmission from the UE2 to the UE1 is realized through a similar processing procedure. As shown in FIG. 1, when the UE1 and the UE2 are located in the same cellular cell, although the two UEs are covered by the cell of the same base station, the data transmitted between the two UEs still needs to be forwarded by a core network, and two parts of wireless spectrum resources are consumed in a single data transmission process.

Thus, the foregoing cellular method is not the optimal choice when user equipments 1 and 2 are located in the same cell and adjacent to each other. Actually, as mobile communication services are increasingly diversified, for example, as the popularization of social networks and electronic payment in wireless communication systems leads to an increasing demand for the service transmission between adjacent users. Thus, a Device-to-Device (D2D) communication mode is getting more and more attention. As shown in FIG. 2, D2D communication refers to the direct transmission of service data from a source UE to a target UE via an air interface, without forwarding the service data using a base station or a core network. For users communicating with each at a near distance, D2D communication not only saves wireless spectrum resources but also reduces the data transmission workload of a core network.

In cellular communication, when two UEs communicate with each other, generally, the two UEs are connected by network equipment/equipments (e.g. a base station or a core network equipment) with each UE not knowing the position of the other UE. Nonetheless, D2D communication is established under the premise of the mutual discovery of UEs. However, no effective solutions have been proposed to address the problem existing in the conventional art regarding how to enable a UE to discover an adjacent UE (the discovery is also called peer discovery).

SUMMARY OF THE INVENTION

The present disclosure provides method, apparatus and system for D2D communication to at least address the problem existing in the conventional art regarding how to enable a UE to discover an adjacent UE.

In accordance with an embodiment of the present disclosure, a apparatus for D2D communication located in a first user equipment is provided which includes: a first receiving module configured to receive configuration message(s) from a network, wherein the configuration information about D2D discovery signal(s) is carried in the configuration message(s); a detection module configured to detect D2D discovery signal(s) from a second user equipment according to the configuration information carried in the configuration message(s); a transmitting module configured to transmit a request message to the network according to the detection of the detection module, wherein the request message is used to request to acquire the identity of the second user equipment transmitting the detected D2D discovery signal(s); and a second receiving module configured to receive a response message sent from the network, wherein the identity of the second user equipment or discovery rejection information indicating the rejection to the discovery of the second user equipment by the first user equipment is carried in the response message.

Preferably, the configuration information about D2D discovery triggering signal(s) is also carried in the configuration message(s); and the transmitting module is also configured to transmit the D2D discovery triggering signal(s) after the first receiving module receives the configuration message(s) and before the detection module detects the discovery signal, wherein the D2D discovery triggering signal(s) is used to trigger the second user equipment which receives the D2D discovery triggering signal(s) and has a peer discovery requirement to transmit the D2D discovery signal(s).

Preferably, the configuration information of the D2D discovery triggering signal(s) includes: a discovery triggering signal set indicating available D2D discovery triggering signals and/or resource configuration parameter(s) indicating the time-domain sub-frame(s) and/or the frequency-domain resource block(s) used for the D2D discovery signal(s) transmission.

Preferably, the configuration message(s) is sent by broadcasting, and the configuration information of the D2D discovery signal(s) includes: a discovery signal set indicating available D2D discovery signals and/or resource configuration parameter(s) indicating the time-domain sub-frame(s) and/or the frequency-domain resource block(s) used for the D2D discovery signal(s) transmission.

Preferably, identification information is carried in the D2D discovery signal(s), wherein the identification information for identifying the second user equipment is allocated by the network and carried in the request message to request for the identity of the second user equipment corresponding to the identification information from the network.

Preferably, the identification information of the detected D2D discovery signal(s) is carried in the request message to request for the identity of the second user equipment transmitting the D2D discovery signal(s) from the network.

Preferably, the identification information of the D2D discovery signal(s) includes the identifier of the D2D discovery signal(s) and/or the index of the resource transmitting the discovery signal, wherein the resource index is represented or determined by the time-domain sub-frame(s) and/or the frequency-domain resource block(s) used for the D2D discovery signal(s) transmission.

In accordance with another embodiment of the present disclosure, a apparatus for D2D communication is provided which is located in a second user equipment and includes: a receiving module configured to receive configuration message(s) from a network, wherein the configuration information about D2D discovery signal(s) is carried in the configuration message(s); and a transmitting module configured to transmit the D2D discovery signal(s) according to the configuration information of the discovery signal.

Preferably, the configuration information about D2D discovery triggering signal(s) is also carried in the configuration message(s); and the apparatus further includes: a first detection module configured to detect the D2D discovery triggering signal(s) from a first user equipment according to the configuration information of the D2D discovery triggering signal(s) before the transmitting module transmits the D2D discovery signal(s) and to trigger the transmitting module to transmit the D2D discovery signal(s) after detected the D2D discovery triggering signal(s).

Preferably, the configuration information of the D2D discovery triggering signal(s) includes: a discovery triggering signal set indicating available D2D discovery triggering signals and/or resource configuration parameter(s) indicating the time-domain, sub-frame(s) and/or the frequency-domain resource block(s) used for the D2D discovery signal(s) transmission.

Preferably, the configuration message(s) is sent by broadcasting, and the configuration information of the D2D discovery signal(s) includes: a discovery signal set indicating available D2D discovery signals and/or resource configuration parameter(s) indicating the time-domain sub-frame(s) and/or the frequency-domain resource block(s) used for the D2D discovery signal(s) transmission.

Preferably, identification information for identifying the second user equipment is carried in the D2D discovery signal(s), and the apparatus further includes: a second is detection module configured to detect paging message(s) from the network, wherein the identification information is carried in the paging message(s) to page the second user equipment transmitting the D2D discovery signal(s); the transmitting module is also configured to transmit a response message to the network after the paging message(s) is detected by the second detection module, wherein the identify information of the second user equipment is carried in the response message, or discovery rejection information indicating the rejection to the discovery of the second user equipment by the first user equipment is carried in the response message.

Preferably, the apparatus further includes: a third detection module configured to detect paging message(s) from the network, wherein the identification information of the D2D discovery signal(s) is carried in the paging message(s) to page the second user equipment transmitting the D2D discovery signal(s); the transmitting module is also configured to transmit a response message to the network, wherein the identify information of the second user equipment is carried in the response message, or discovery rejection information indicating the rejection to the discovery of the second user equipment by the first user equipment is carried in the response message.

Preferably, the identification information of the D2D discovery signal(s) includes the identifier of the D2D discovery signal(s) and/or the index of the resource transmitting the D2D discovery signal(s), wherein the resource index is represented or determined by the time-domain sub-frame(s) and/or the frequency-domain resource block(s) used for the D2D discovery signal(s) transmission.

In accordance with still another embodiment of the present disclosure, a apparatus for D2D communication located at a network is provided which includes: a first transmitting module configured to transmit configuration message(s), wherein the configuration information about D2D discovery signal(s) is carried in the configuration message(s); a detection module configured to detect a request message from a first user equipment, wherein the request message is sent by the first user equipment according to a detected D2D discovery signal to request for the identity of the second user equipment transmitting the discovery signal; and a second transmitting module configured to transmit a response message to the first user equipment in response to the request message, wherein the identity of the second user equipment or discovery rejection information indicating the rejection to the discovery of the second user equipment by the first user equipment is carried in the response message.

Preferably, the identification information of the second user equipment is carried in the request message to request for the identify information of the second user equipment corresponding to the identification information.

Preferably, the identification information of the D2D discovery signal(s) is carried in the request message to request for the identify information of the second user equipment transmitting the D2D discovery signal(s).

Preferably, the identification information of the D2D discovery signal(s) includes the identifier of the discovery signal and/or the index of the resource transmitting the discovery signal, wherein the resource index is represented or determined by the time-domain sub-frame(s) and/or the frequency-domain resource block(s) used for the D2D discovery signal(s) transmission.

Preferably, the apparatus further includes: a third transmitting module configured to transmit paging message(s) for paging the second user equipment in response to the request message after the request message is detected by the detection module; a receiving module configured to receive a discovery response message sent by the second user equipment, the identify information of the second user equipment or the discovery rejection information is carried in the discovery response message; or a determination module configured to determine whether or not the second user equipment can be discovered by the first user equipment according to a preset authority configuration; an acquisition module configured to acquire the identity of the second user equipment corresponding to the identification information carried in the request message according to a preset corresponding relationship between identification information, and the identify information of user equipments if the determination result of the determination module is that the second user equipment can be discovered by the first user equipment, and a fourth transmitting module configured to transmit the response message carrying the identify information of the second user equipment to the first user equipment if the determination result of the determination module is that the second user equipment can be discovered by the first user equipment, or to transmit the response message carrying the discovery rejection information to the first user equipment if the determination result of the determination module is that the second user equipment cannot be discovered by the first user equipment.

Preferably, the configuration information about D2D discovery triggering signal(s) is also carried in the configuration message(s), and the configuration information of the D2D discovery triggering signal(s) includes: a discovery triggering signal set indicating available D2D discovery triggering signals and/or resource configuration parameter(s) indicating the time-domain sub-frame(s) and/or the frequency-domain resource block(s) used for the D2D discovery signal(s) transmission.

Preferably, the configuration message(s) is sent via high-layer signaling by broadcasting, and the configuration information of the D2D discovery signal(s) includes: a discovery signal set indicating available D2D discovery signal(s) and/or resource configuration parameter(s) indicating the time-domain sub-frame(s) and/or the frequency-domain resource block(s) used for the D2D discovery signal(s) transmission.

In accordance with yet another embodiment of the present disclosure, a wireless communication system is provided which includes: the network of a cellular network, a first user equipment and a second user equipment, wherein the network includes the foregoing apparatus for D2D communication which is located at a network, the first user equipment includes the foregoing apparatus for D2D communication which is located at a first user equipment, and the second user equipment includes the foregoing apparatus for D2D communication located which is located at a second user equipment.

In accordance with yet another embodiment of the present disclosure, a method for D2D communication is provided which includes that: a first user equipment receives configuration message(s) from a network, wherein the configuration information about D2D discovery signal(s) is carried in the configuration message(s); the first user equipment detects D2D discovery signal(s) from a second user equipment according to the configuration information carried in the configuration message(s); the first user equipment transmits a request message to the network according to the result of the detection to request to acquire the identity of the second user equipment transmitting the detected D2D discovery signal; and the first user equipment receives a response message returned from the network, wherein the identity of the second user equipment or discovery rejection information indicating the rejection to the discovery of the second user equipment by the first user equipment is carried in the response message.

Preferably, the configuration information about D2D discovery triggering signal(s) is also carried in the configuration message(s), and after the configuration message(s) is received but before the D2D discovery signal(s) is detected by the detection module, the method further includes that: the first user equipment transmits D2D discovery triggering signal(s) to instruct the second user equipment receiving the D2D discovery triggering signal(s) to transmit the D2D discovery signal(s); and after receiving the D2D discovery triggering signal(s), the second user equipment transmits the D2D discovery signal(s).

Preferably, the configuration information of the D2D discovery triggering signal(s) includes: D2D discovery triggering signal(s) set indicating available D2D discovery triggering signals and/or resource configuration parameter(s) indicating the time-domain sub-frame(s) and/or the frequency-domain resource block(s) used for the D2D discovery signal(s) transmission.

Preferably, the configuration message(s) is sent by broadcasting, and the configuration information of the D2D discovery signal(s) includes: a discovery signal set indicating available D2D discovery signal(s) and/or resource configuration parameter(s) indicating the time-domain sub-frame(s) and/or the frequency-domain resource block(s) used for the D2D discovery signal(s) transmission.

Preferably, the identification information of the second user equipment is carried in the D2D discovery signal(s), and the identification information is allocated by the network and carried in the request message to request for the identity of the second user equipment corresponding to the identification information from the network.

Preferably, after the first user equipment transmits a request message to the network according to the result of the detection, the method further includes that: the network pages the second user equipment corresponding to the identification information carried in the request message and receives a response message returned from the second user equipment, wherein the identify information of the second user equipment or the discovery rejection information is carried in the response message; or the network determines whether or not the second user equipment can be discovered by the first user equipment according to a preset authority configuration, if so, acquires the identify information of the second user equipment corresponding to the identification information carried in the request message according to a correspondence between identification information and the identify information of user equipments preset at the network and transmits the response message carrying the identify information of the second user equipment to the first user equipment, otherwise, transmits the response message carrying the discovery rejection information to the first user equipment.

Preferably, the identification information of the received D2D discovery signal is carried in the request message to request for the identify information of the second user equipment transmitting the D2D discovery signal(s) from the network, and after the first user equipment transmits a request message to the network according to the result of the detection, the method further includes that: the network transmits paging message(s) in which the identification information of the D2D discovery signal(s) is carried; the second user equipment detects the paging message(s) and determines that the D2D discovery signal(s) indicated by the identification information of the D2D discovery signal(s) carried in the paging message(s) is sent by the second user equipment; the second user equipment returns a response message to the network, wherein the identity of the second user equipment or the discovery rejection information is carried in the response message; and after receiving the response message, the network transmits the response message to the first user equipment, wherein the identity of the second user equipment or the discovery rejection information is carried in the response message.

Preferably, the identification information of the D2D discovery signal(s) includes the identifier of the D2D discovery signal(s) and/or the index of the resource transmitting the D2D discovery signal(s), wherein the resource index is determined by the time-domain sub-frame(s) and/or the frequency-domain resource block(s) used for the D2D discovery signal(s) transmission.

In accordance with still another embodiment of the present disclosure, a method for D2D communication is provided which includes that: a second user equipment receives configuration message(s) from a network, wherein the configuration information about D2D discovery signal(s) is carried in the configuration message(s); and the second user equipment transmits the D2D discovery signal(s) according to the configuration information of the D2D discovery signal(s).

Preferably, the configuration information about D2D discovery triggering signal(s) is also carried in the configuration message(s); and the method further includes that: before transmitting the D2D discovery signal(s), the second user equipment detects D2D discovery triggering signal(s) from a first user equipment according to the configuration information of the D2D discovery triggering signal(s) and transmits the D2D discovery signal(s) after detected the D2D discovery triggering signal(s).

Preferably, the configuration information of the D2D discovery triggering signal(s) includes: D2D discovery triggering signal(s) set indicating available D2D discovery triggering signals and/or resource configuration parameter(s) indicating the time-domain sub-frame(s) and/or the frequency-domain resource block(s) used for the D2D discovery signal(s) transmission.

Preferably, identification information for identifying the second user equipment is carried in the D2D discovery signal(s), and the method further includes that: the second user equipment detects paging message(s) from the network, wherein the identification information of the second user equipment is carried in the paging message(s) to page the second user equipment; and after detected the paging message(s), the second user equipment transmits a response message to the network, wherein the identify information of the second user equipment is carried in the response message, or discovery rejection information indicating the rejection to the discovery of the second user equipment by the first user equipment is carried in the response message.

Preferably, the method further includes that: the second user equipment detects paging message(s) from the network, wherein information of the D2D discovery signal(s) is carried in the paging message(s) to page the second user equipment transmitting the D2D discovery signal(s); and the second user equipment transmits a response message to the network, wherein the identify information of the second user equipment is carried in the response message, or discovery rejection information indicating the rejection to the discovery of the second user equipment by the first user equipment is carried in the response message.

In accordance with still another embodiment of the present disclosure, a apparatus for D2D communication is provided which includes that: a networks transmits configuration message(s) to a user equipment under the management of the network, wherein the configuration information about D2D discovery signal(s) is carried in the configuration message(s); the network detects a request message from a first user equipment, wherein the request message is sent by the first user equipment according to a detected D2D discovery signal to request for the identity of the second user equipment transmitting the discovery signal; and the network transmits a response message to the first user equipment in response to the request message, wherein the identity of the second user equipment or discovery rejection information indicating the rejection to the discovery of the second user equipment by the first user equipment is carried in the response message.

Preferably, the identification information of the second user equipment is carried in the request message to request for the identify information of the second user equipment corresponding to the identification information.

Preferably, the identification information of the D2D discovery signal(s) is carried in the request message to request for the identify information of the second user equipment transmitting the D2D discovery signal(s).

Preferably, the method further includes that: after detected the request message, the network transmits paging message(s) for paging the second user equipment in response to the request message and receives a response message returned from the second user equipment, wherein the identify information of the second user equipment or the discovery rejection information indicating the rejection to the discovery of the second user equipment by the first user equipment is carried in the response message; or the network determines whether or not the second user equipment can be discovered by the first user equipment according to a preset authority configuration, if so, acquires the identify information of the second user equipment corresponding to the identification information carried in the request message according to a correspondence between identification information and the identify information of user equipments preset at the network and transmits the response message carrying the identify information of the second user equipment to, the first user equipment, otherwise, transmits the response message carrying the discovery rejection information to the first user equipment.

Preferably, the configuration information about D2D discovery triggering signal(s) is also carried in the configuration message(s), and the configuration information of the D2D discovery triggering signal(s) includes: D2D discovery triggering signal(s) set indicating available D2D discovery triggering signals and/or resource configuration parameter(s) indicating the time-domain sub-frame(s) and/or the frequency-domain resource block(s) used for the D2D discovery signal(s) transmission.

The present disclosure addresses the problem of peer discovery of D2D incorporated in a cellular communication system, enables a user equipment to directly transmit and detect D2D discovery signal(s) and improves the flexibility of peer discovery.

BRIEF DESCRIPTION OF THE DRAWINGS

The accompanying drawings described here are provided for a better understanding of the present disclosure and constitute one part of the present disclosure, and the exemplary embodiments of the present disclosure and description thereof are illustrative of the present disclosure but are not to be construed as limiting the present disclosure. In the accompanying drawings.

DETAILED DESCRIPTION OF THE EMBODIMENTS

The present disclosure is described below in detail with reference to accompanying drawings when read in conjunction with embodiments. It should be noted that embodiments of the present disclosure and the features thereof can be combined with each other if no conflict is caused.

The premise of D2D communication is the mutual discovery of user equipments. That is, a user equipment needs to determine the existence of another user equipment applicable for D2D communication in an adjacent area or determine the existence of a specific D2D communication target user equipment to be connected in an adjacent area. This determination is herein referred to as the peer discovery of D2D communication.

A wireless communication system is provided in an embodiment of the present disclosure which achieves the peer discovery of D2D incorporated in a cellular communication system.

Figure 1:
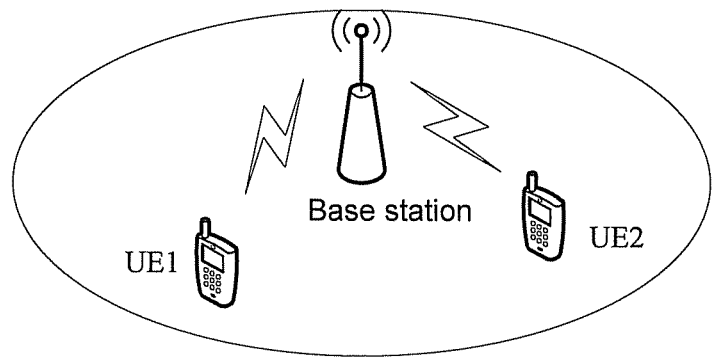
FIG. 1 is a schematic diagram illustrating the cellular communication between UEs located in the cell of the same base station according to the conventional art.
Figure 2:
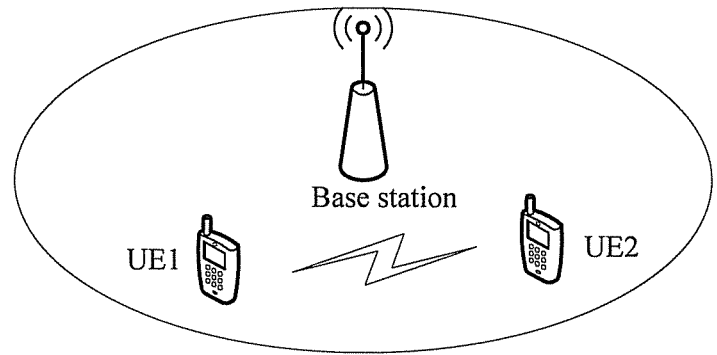
FIG. 2 is a schematic diagram illustrating D2D communication according to the conventional art.
Figure 3:
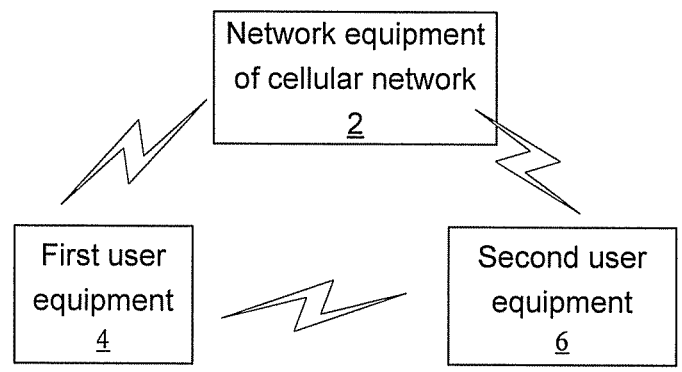
FIG. 3 is a schematic diagram illustrating the structure of a wireless communication system according to an embodiment of the present disclosure.

FIG. 3 is a schematic diagram illustrating the structure of a wireless communication system according to an embodiment of the present disclosure, and as shown in FIG. 3, the wireless communication system provided in an embodiment of the present disclosure includes: the network 2 of a cellular network, a first user equipment 4 and a second user equipment 6, which are separately described below.

Figure 4:
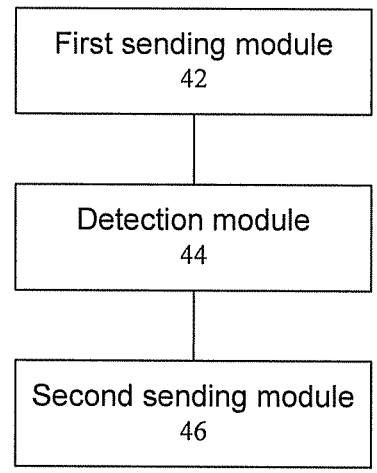
FIG. 4 is a schematic diagram illustrating the structure of a apparatus 1 for D2D communication according to an embodiment of the present disclosure.

In an embodiment, the network 2 of a cellular network may include the apparatus shown in FIG. 4 in D2D communication. As shown in FIG. 4, the apparatus in D2D communication may include: a first transmitting module 42 configured to transmit configuration message(s), wherein the configuration information about D2D discovery signal(s) is carried in the configuration message(s); a detection module 44 configured to detect a request message from the first user equipment 4, wherein the request message is used to request for the identity of the second user equipment 6; and a second transmitting module 46 configured to transmit a response message to the first user equipment 4 in response to the request message, wherein the identity of the second user equipment 6 or discovery rejection information indicating the rejection to the discovery of the second user equipment 6 by the first user equipment 4 is carried in the response message. If the second user equipment 6 allows to be discovered by the first user equipment 4, then the identity of the second user equipment 6 is carried in the response message, otherwise, the discovery rejection information is carried in the response message.

In an embodiment, the identification information of the second user equipment 6 is carried in the request message to request for the identify information of the second user equipment 6 corresponding to the identification information. The identification information may be a temporary identifier.

Alternatively, in another embodiment, D2D discovery signal(s) (the D2D discovery signal(s) is the D2D discovery signal(s) detected by the first user equipment 4) may also be carried in the request message to request for the identity of the second user equipment 6 transmitting the D2D discovery signal(s).

Preferably, the identification information of the D2D discovery signal(s) includes, but is not limited to: the index identifier of the D2D discovery signal(s) and/or the index of the resource transmitting the D2D discovery signal(s), wherein the resource index can be determined by the time-domain sub-frame(s) and/or the frequency-domain resource block(s) used for the D2D discovery signal(s) transmission.

In an embodiment, the apparatus may further include: a third transmitting module configured to transmit paging message(s) for paging the second user equipment in response to the request message after the request message is detected by the detection module 44, and a receiving module configured to receive a response message sent by the second user equipment 6, wherein the identity of the second user equipment or the discovery rejection information is carried in the response message. In the embodiment, the network 2 can page the second user equipment 6 to acquire the identity of the second user equipment or the discovery rejection information indicating the rejection of the second user equipment 6 to the discovery by the first user equipment 4.

Alternatively, in another embodiment, an authority strategy may be set at the network 2 in advance, after the network 2 receives the request message of the first user equipment 4, the determination module determines whether or not the second user equipment 6 allows to be discovered by the first user equipment 4 in response to the request message, if the second user equipment 6 allows to be discovered by the first user equipment 4, the acquisition module acquires the identity of the second user equipment 6 according to the information carried in the request message, for example, if the equipment identifier of the second user equipment is carried in the request message, then the network 2 acquires the identity corresponding to the equipment identifier of the second user equipment according to a preset correspondence between equipment identifiers ad identity, and then a fourth transmitting module transmits a response message to the first user equipment 4, wherein the identity of the second user equipment is carried in the response message. If the network 2 determines that the second user equipment 6 refuses to be discovered by the first user equipment 4, then the fourth transmitting module transmits the response message carrying the discovery rejection information to the first user equipment 4.

In an embodiment, the identity may be an identifier (ID) uniquely representing the second user equipment in a specific range, the specific range referring to a specific space range and/or a specific time range, or the identity is the unique permanent identifier (ID) of the second user equipment.

In an embodiment, the configuration information about D2D discovery triggering signal(s) is also carried in the configuration message(s), and the configuration information of the D2D discovery triggering signal(s) includes, but is not limited to: D2D discovery triggering signal(s) set indicating available D2D discovery triggering signals and/or resource configuration parameter(s) indicating the time-domain sub-frame(s) and/or the frequency-domain resource block(s) used for the D2D discovery signal(s) transmission.

In the embodiment, the configuration message(s) is sent via high-layer signaling by broadcasting, and the configuration information of the D2D discovery signal(s) includes, but is not limited to: a discovery signal set indicating available D2D discovery signal(s), and/or resource configuration parameter(s) indicating the time-domain sub-frame(s) and/or the frequency-domain resource block(s) used for the D2D discovery signal(s) transmission.

Figure 5:
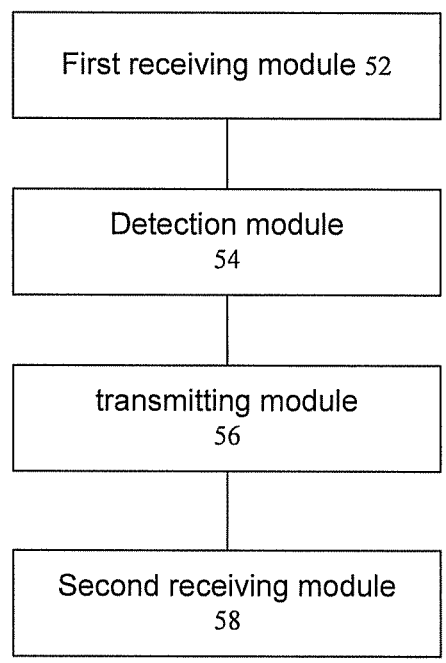
FIG. 5 is a schematic diagram illustrating the structure of a apparatus 2 for D2D communication according to an embodiment of the present disclosure.

In an embodiment, the first user equipment 4 may include the apparatus shown in FIG. 5 for D2D communication. As shown in FIG. 5, the apparatus for D2D communication located in the first user equipment 4 may include: a first receiving module 52 configured to receive configuration message(s) from the network, wherein the configuration information about D2D discovery signal(s) is carried in the configuration message(s); a detection module 54 coupled with the first receiving module 52 and configured to detect D2D discovery signal(s) from the second user equipment 6 according to the configuration information carried in the configuration message(s); a transmitting module 56 coupled with the detection module 54 and configured to transmit a request message to the network 2 according to the detection of the detection module to request to acquire the identity of the second user equipment 2 transmitting the detected D2D discovery signal; and a second receiving module 58 configured to receive a response message sent from the network 2, wherein the identity, of the second user equipment 6 or discovery rejection information indicating the rejection to the discovery of the second user equipment 6 by the first user equipment 4 is carried in the response message.

In an implementation mode, the configuration information about D2D discovery triggering signal(s) is also carried in the configuration message(s); and the transmitting module 56 is also configured to transmit the D2D discovery triggering signal(s) after the first receiving module 52 receives the configuration message(s) and before the detection module 54 detects a D2D discovery signal, wherein the D2D discovery, triggering signal(s) is used to trigger the second user equipment which receives the D2D discovery triggering signal(s) and has a peer discovery requirement to transmit the D2D discovery signal(s).

In an implementation mode, the configuration information of the D2D discovery triggering signal(s) may include: D2D discovery triggering signal(s) set indicating available D2D discovery triggering signals and/or resource configuration parameter(s) indicating the time-domain sub-frame(s) and/ or the frequency-domain resource block(s) used for the D2D discovery signal(s) transmission.

In an implementation mode, the configuration message(s) is sent by broadcasting, and the configuration information of the D2D discovery signal(s) includes: a discovery signal set indicating available D2D discovery signal(s), and/or resource configuration parameter(s) indicating the time-domain sub-frame(s) and/or the frequency-domain resource block(s) used for the D2D discovery signal(s) transmission.

In an implementation mode of the embodiment, the identification information of the second user equipment 6 may be carried in the D2D discovery signal(s), and the identification information is allocated by the network 2 and may be carried in the request message to request for the identity of the second user equipment 6 corresponding to the identification information from the network 2.

Alternatively, in another implementation mode of the embodiment, the identification information of the detected D2D discovery signal may also be carried in the request message to request for the identity of the second user equipment 6 transmitting the D2D discovery signal(s) from the network 2.

In an implementation mode of the embodiment, the identification information of the D2D discovery signal(s) includes, but is not limited to: the identifier of the D2D discovery signal(s) and/or the index of the resource transmitting the D2D discovery signal(s), wherein the resource index is determined by the time-domain sub-frame(s) and/or the frequency-domain resource block(s) used for the D2D discovery signal(s) transmission.

Figure 6:
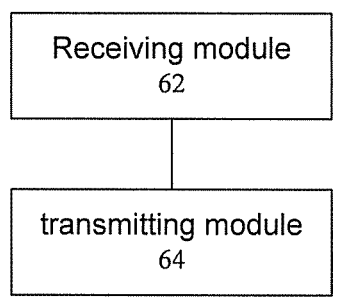
FIG. 6 is a schematic diagram illustrating the structure of a apparatus 3 for D2D communication according to an embodiment of the present disclosure.

In an embodiment, the second user equipment 6 may include the apparatus shown in FIG. 6 for D2D communication. As shown in FIG. 6, in an embodiment of the present disclosure, the apparatus for D2D communication located in the second user equipment 6 includes: a receiving module 62 configured to receive configuration message(s) from a network, wherein the configuration information about D2D discovery signal(s) is carried in the configuration message(s); and a transmitting module 64 configured to transmit the D2D discovery signal(s) according to the configuration information of the D2D discovery signal.

In an implementation mode of the embodiment, the configuration information about D2D discovery triggering signal(s) is also carried in the configuration message(s); and the apparatus further includes: a first detection module configured to detect the D2D discovery triggering signal(s) from a first user equipment according to the configuration information of the D2D discovery triggering signal(s) before the transmitting module 64 transmits the D2D discovery signal(s) and to trigger the transmitting module 64 to transmit the D2D discovery signal(s) after detected the D2D discovery triggering signal(s).

In an implementation mode of the embodiment, the configuration information of the D2D discovery triggering signal(s) includes, but is not limited to: D2D discovery triggering signal(s) set indicating available D2D discovery triggering signals and/or resource configuration parameter(s) indicating the time-domain sub-frame(s) and/ or the frequency-domain resource block(s) used for the D2D discovery signal(s) transmission.

In an implementation mode of the embodiment, the configuration message(s) is sent by broadcasting, and the configuration information of the D2D discovery signal(s) includes, but is not limited to: a discovery signal set indicating available D2D discovery signal(s), and/or resource configuration parameter(s) indicating the time-domain sub-frame(s) and/or the frequency-domain resource block(s) used for the D2D discovery signal(s) transmission.

In the embodiment, the identification information of the second user equipment 6 is carried in the D2D discovery signal(s), and the apparatus may further include: a second detection module configured to detect paging message(s) from the network, wherein the equipment identifier of the second user equipment is carried in the paging message(s) to page the second user equipment; the transmitting module 64 is further configured to transmit a response message to the network after the paging message(s) is detected by the second detection module, wherein the identify information of the second user equipment is carried in the response message, or discovery rejection information indicating the rejection to the discovery of the second user equipment by the first user equipment is carried in the response message.

In an implementation mode of the embodiment, the apparatus further includes: a third detection module configured to detect paging message(s) from the network, wherein information of the D2D discovery signal(s) is carried in the paging message(s) to page the second user equipment transmitting the D2D discovery signal(s); the transmitting module 64 is also configured to transmit a response message to the network, wherein the identify information of the second user equipment is carried in the response message, or discovery rejection information indicating the rejection to the discovery of the second user equipment by the first user equipment is carried in the response message.

In the foregoing implementation mode, when the paging message(s) sent to the second user equipment 6 is detected by the second or third detection module, the second user equipment 6 can determine whether or not to be discovered by the first user equipment 4, if so, the identity of the second user equipment is carried in the response message sent by the transmitting module 64, otherwise, discovery rejection information is carried in the response message sent by the transmitting module 64.

Preferably, the information of the D2D discovery signal(s) includes, but is not limited to: the identifier of the D2D discovery signal(s) and the index of the resource transmitting the D2D discovery signal(s), wherein the resource index is determined by the time-domain sub-frame(s) and/or the frequency-domain resource block(s) used for the D2D discovery signal(s) transmission.

A method for D2D communication is provided in an embodiment of the present disclosure which can be realized by the foregoing apparatus or system for D2D communication.

Figure 7:
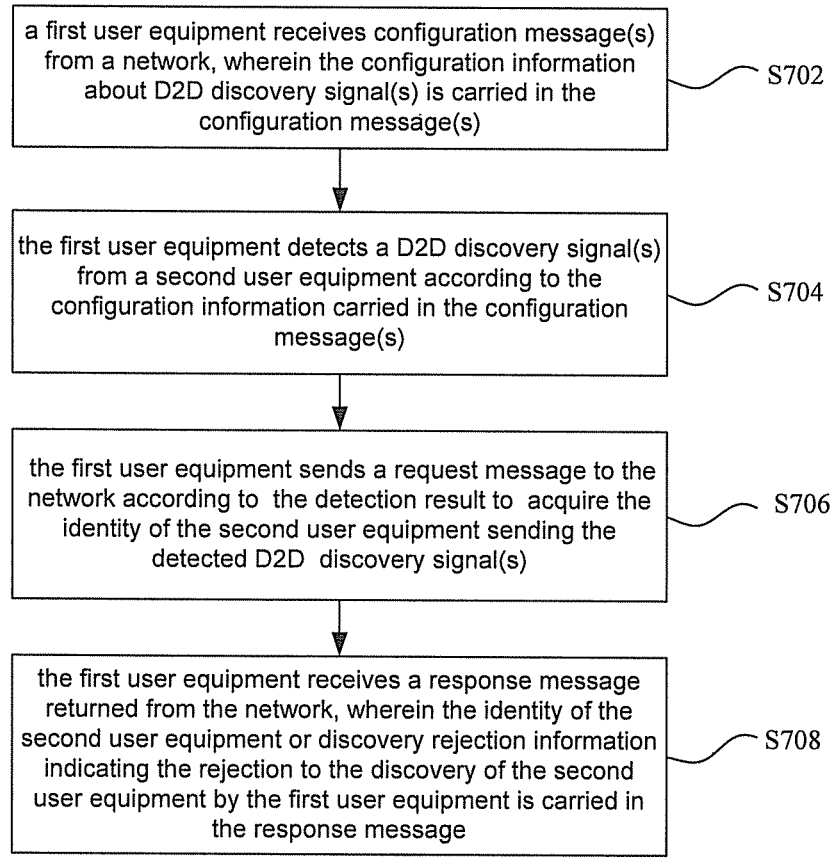
FIG. 7 is a flowchart 1 illustrating a method for D2D communication according to an embodiment of the present disclosure.

FIG. 7 is a flowchart illustrating a method for D2D communication according to an embodiment of the present disclosure, and as shown in FIG. 7, the peer discovery method for D2D communication mainly includes the following steps: (Step S702-Step S708):

Step S702: a first user equipment receives configuration message(s) from a network, wherein the configuration information about D2D discovery signal(s) is carried in the configuration message(s);

Step S704: the first user equipment detects D2D discovery signal(s) from a second user equipment according to the configuration information carried in the configuration message(s);

Step S706: the first user equipment transmits a request message to the network according to the result of the detection to request to acquire the identity of the second user equipment transmitting the detected D2D discovery signal;

Step S708; the first user equipment receives a response message returned from the network, wherein the identity of the second user equipment or discovery rejection information indicating the rejection to the discovery of the second user equipment by the first user equipment is carried in the response message.

If the second user equipment allows to be discovered by the first user equipment, then the identity of the second user equipment is carried in the response message, otherwise, the discovery rejection information is carried in the response message.

In an implementation mode of the embodiment, the configuration information about D2D discovery triggering signal(s) is also carried in the configuration message(s), and after the configuration message(s) is received but before the D2D discovery signal(s) is detected by the detection module, the method further includes that: the first user equipment transmits D2D discovery triggering signal(s) to instruct the second user equipment receiving the D2D discovery triggering signal(s) to transmit the D2D discovery signal(s); and after receiving the D2D discovery triggering signal(s), the second user equipment transmits the D2D discovery signal(s).

In an implementation mode of the embodiment, the configuration information of the D2D discovery triggering signal(s) includes, but is not limited to: D2D discovery triggering signal(s) set indicating available D2D discovery triggering signals and/or resource configuration parameter(s) indicating the time-domain sub-frame(s) and/or the frequency-domain resource block(s) used for the D2D discovery signal(s) transmission.

In an implementation mode of the embodiment, the configuration message(s) is sent by broadcasting, and the configuration information of the D2D discovery signal(s) includes, but is not limited to: a discovery signal set indicating available D2D discovery signal(s), and/or resource configuration parameter(s) indicating the time-domain sub-frame(s) and/or the frequency-domain resource block(s) used for the D2D discovery signal(s) transmission.

In an implementation mode of the embodiment, the identification information of the second user equipment may be carried in the D2D discovery signal(s), and the identification information is allocated by the network and carried in the request message to request for the identity of the second user equipment corresponding to the identification information from the network.

Based on the foregoing implementation mode, in the embodiment, after the first user equipment transmits a request message to the network according to the detection, the method further includes: the network pages the second user equipment corresponding to the identification information carried in the request message and receives a response message returned from the second user equipment, wherein the identify information of the second user equipment or the discovery rejection information is carried in the response message; or the network determines whether or not the second user equipment can be discovered by the first user equipment according to a preset authority configuration, if so, acquires the identify information of the second user equipment corresponding to the identification information carried in the request message according to a correspondence between identification information and the identify information of user equipments preset at the network and transmits the response message carrying the identify information of the second user equipment to the first user equipment, otherwise, transmits the response message carrying the discovery rejection information to the first user equipment.

In an implementation mode of the embodiment, the identification information of the received D2D discovery signal is carried in the request message to request for the identify information of the second user equipment transmitting the D2D discovery signal(s), and after the first user equipment transmits a request message to the network according to the detection, the method further includes that: the network transmits paging message(s) in which information of the D2D discovery signal(s) is carried; the second user equipment detects the paging message(s) and determines that the D2D discovery signal(s) indicated by the information of the D2D discovery signal(s) carried in the paging message(s) is sent by the second user equipment; the second user equipment returns a response message to the network, wherein the identity of the second user equipment or the discovery rejection information is carried in the response message; and after receiving the response message, the network transmits the response message to the first user equipment, wherein the identity of the second user equipment or the discovery rejection information is carried in the response message.

Preferably, the identification information of the D2D discovery signal(s) includes, but is not limited to: the identifier of the D2D discovery signal(s) and the index of the resource transmitting the D2D discovery signal(s), wherein the resource index is represented or determined by the time-domain sub-frame(s) and/or the frequency-domain resource block(s) used for the D2D discovery signal(s) transmission.

In accordance with an embodiment of the present disclosure, a method for D2D communication is provided which can be realized by the foregoing apparatus in D2D communication of the second user equipment.

Figure 8:
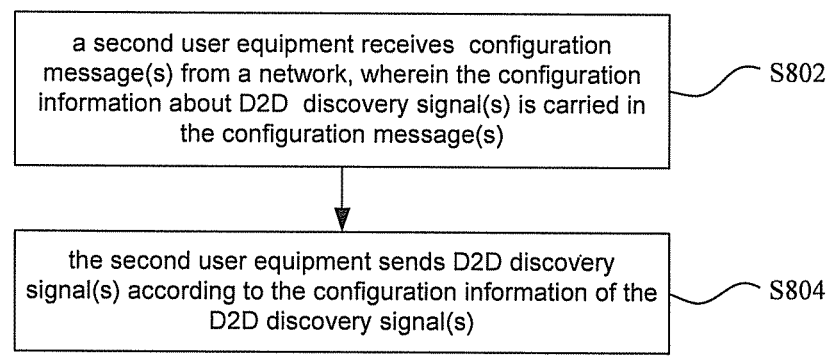
FIG. 8 is a flowchart 2 illustrating a method for D2D communication according to an embodiment of the present disclosure.

FIG. 8 is a flowchart illustrating a method for D2D communication according to an embodiment of the present disclosure, and as shown in FIG. 8, the method includes the following steps: (Step S802-Step S804):

Step S802: a second user equipment receives configuration message(s) from a network, wherein the configuration information about D2D discovery signal(s) is carried in the configuration message(s);

Step S804: the second user equipment transmits D2D discovery signal(s) according to the configuration information of the D2D discovery signal(s).

In an implementation mode of the embodiment, the configuration information about D2D discovery triggering signal(s) is also carried in the configuration message(s); and the method may further include that: before transmitting the D2D discovery signal(s), the second user equipment detects D2D discovery triggering signal(s) from a first user equipment according to the configuration information of the D2D discovery triggering signal(s) and transmits the D2D discovery signal after detected the D2D discovery triggering signal(s).

In an implementation mode of the embodiment, the configuration information of the D2D discovery triggering signal(s) includes, but is not limited to: D2D discovery triggering signal(s) set indicating available D2D discovery triggering signals and/or resource configuration parameter(s) indicating the time-domain sub-frame(s) and/or the frequency-domain resource block(s) used for the D2D discovery signal(s) transmission.

In an implementation mode of the embodiment, the identification information of the second user equipment is carried in the D2D discovery signal(s), and the method may further include that: the second user equipment detects paging message(s) from the network, wherein the equipment identifier of the second user equipment is carried in the paging message(s) to page the second user equipment; and after detected the paging message(s), the second user equipment transmits a response message to the network, wherein the identify information of the second user equipment is carried in the response message, or discovery rejection information is carried in the response message.

In an implementation mode of the embodiment, the method may further include that: the second user equipment detects paging message(s) from the network, wherein information of the D2D discovery signal(s) is carried in the paging message(s) to page the second user equipment transmitting the D2D discovery signal(s); and the second user equipment transmits a response message to the network, wherein the identify information of the second user equipment is carried in the response message, or discovery rejection information is carried in the response message.

In accordance with an embodiment of the present disclosure, another method for D2D communication is provided which can be realized by the foregoing apparatus in D2D communication of a network.

Figure 9:
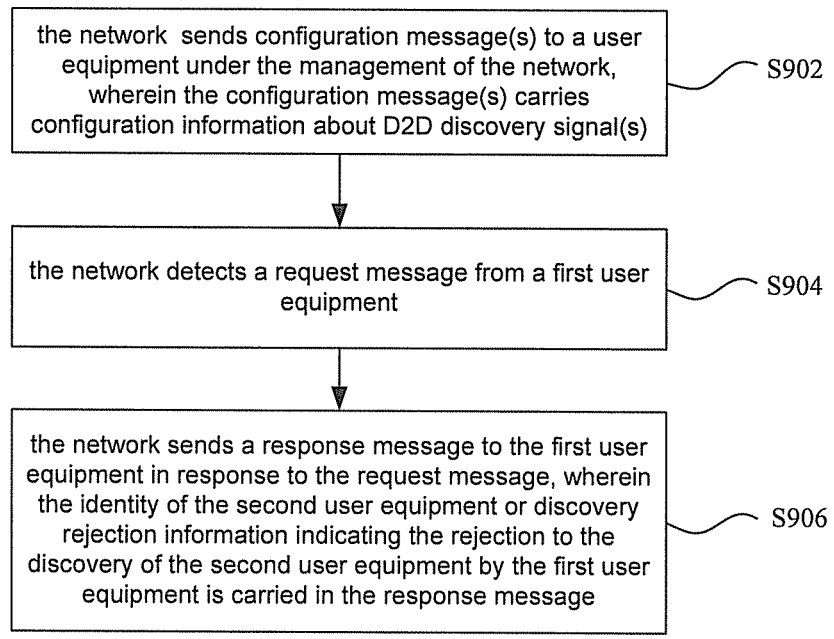
FIG. 9 is a flowchart 3 illustrating a method for D2D communication according to an embodiment of the present disclosure.

FIG. 9 is a flowchart illustrating the method for D2D communication, and as shown in FIG. 9, the method mainly includes the following steps: (Step S902-Step S906):

Step S902: the network transmits configuration message(s) in which the configuration information about D2D discovery signal(s) is carried, wherein the configuration message(s) may be sent by broadcasting;

Step S904: the network detects a request message from a first user equipment, wherein the request message is used to request for the identity of a second user equipment;

Step S906: the network transmits a response message to the first user equipment in response to the request message, wherein the identity of the second user equipment or discovery rejection information indicating the rejection to the discovery of the second user equipment by the first user equipment is carried in the response message.

In an implementation mode of the embodiment, the identification information of the second user equipment is carried in the request message to request for the identify information of the second user equipment corresponding to the identification information. The identification information may be a temporary identifier.

In another implementation mode of the embodiment, information of D2D discovery signal(s) may also be carried in the request message to request for the identity of the second user equipment transmitting the D2D discovery signal(s).

In another implementation mode of the embodiment, the method further includes that: the network transmits paging message(s) for paging the second user equipment in response to the request message after detected the request message and receives a response message returned from the second user equipment, wherein the identity of the second user equipment or discovery rejection information indicating the rejection to the discovery of the second user equipment by the first user equipment is carried in the response message; alternatively, the network determines whether or not the second user equipment can be discovered by the first user equipment according to a preset authority configuration, if so, acquires the identity of the second user equipment corresponding to the identification information carried in the request message according to a correspondence between identification information and the identify, information of user equipments preset at the network and transmits the response message carrying the identify information of the second user equipment to the first user equipment, otherwise, transmits the response message carrying the discovery rejection information to the first user equipment.

In another implementation mode of the embodiment, the configuration information about D2D discovery triggering signal(s) is also carried in the configuration message(s), wherein the configuration information of the D2D discovery triggering signal(s) includes: D2D discovery triggering signal(s) set indicating available D2D discovery triggering signals and/or resource configuration parameter(s) indicating the time-domain sub-frame(s) and/or the frequency-domain resource block(s) used for the D2D discovery signal(s) transmission.

Figure 10:
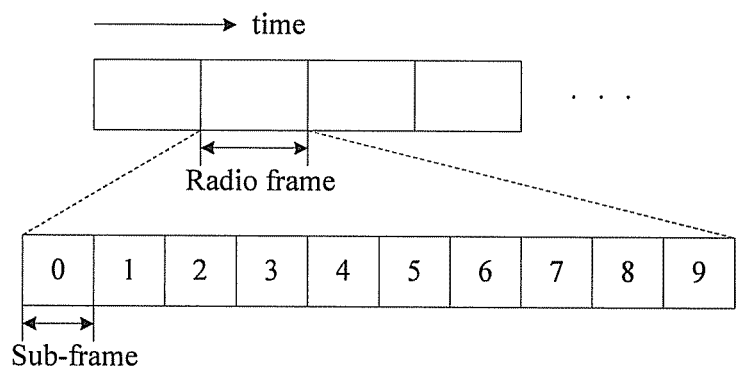
FIG. 10 is a schematic diagram illustrating the structure of the radio frame of an LTE/LTE-A system.

The technical scheme of the present disclosure is described below by taking a 3GPP (3rd Generation Partnership Project) LTE (Long Term Evolution)/LTE-A (LTE-Advanced) cellular communication system as example. In an LTE/LTE-A system, downlink bases on an Orthogonal Frequency Division Multiplexing (OFDM) technology while uplink employs a Single carrier-Frequency Division Multiplexing Access (SC-FDMA) technology. In an OFDM/SC-FDMA system, communication resources are in a two-dimensional time-frequency pattern. For example, for an LTE/LTEE-A system, communication resources of uplink and downlink are both divided in frames in the time direction, and as shown in FIG. 10, the length of each radio frame is 10 ms, including 10 sub-frames the lengths of which are all 1 ms, and each sub-frame includes two slots the lengths of which are both 0.5 ms.

Figure 11:
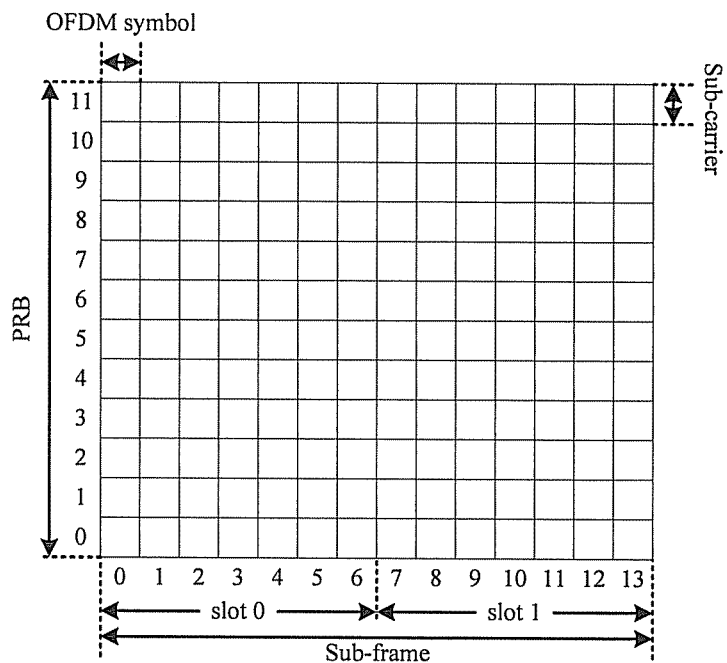
FIG. 11 is a schematic diagram illustrating the structure of a physical resource of an LTE/LTE-A system.

Resource is divided in sub-carriers in the frequency direction, and specifically, in communication, a frequency-domain resource is allocated by taking resource block (RB) as a minimal unit, each RB corresponding to a Physical RB (PRB) of a physical resource. As shown in FIG. 11, a PRB includes 12 sub-carriers in the frequency domain, corresponding to a slot of the time domain. The resource on each OFDM symbol corresponding to a sub-carrier is referred to as a Resource Element (RE).

In LTE/LTE-A cellular communication, an UE discovers an LTE cell by detecting a Synchronization Signal (SS). The SS includes a Primary SS (PSS) and a Secondary SS (SSS). The UE detects the SS to acquire the central frequency point of downlink to be synchronized with the downlink of a base station. Moreover, as a physical cell identifier is carried in the SS, the SS being detected by the UE also means that an 'LTE/LTE-A cell' is discovered by the UE.

When there is uplink data needing transmitting on uplink, the UE needs to initiate a Random Access (RA) to be synchronized on uplink and enter into a Connected state from a Radio Resource Control (RRC) idle state. During the random access, the UE needs to transmit a random access preamble, and by blindly detecting the random access preamble in a specific time-frequency resource, the network recognizes the UE and implements uplink synchronization for the UE D2D communication also confronts the similar problem, that is, UEs between which a D2D communication is to be conducted need to discover (and recognize) each other. The situation is described below with reference to specific embodiments.

Embodiment 1

Figure 12:
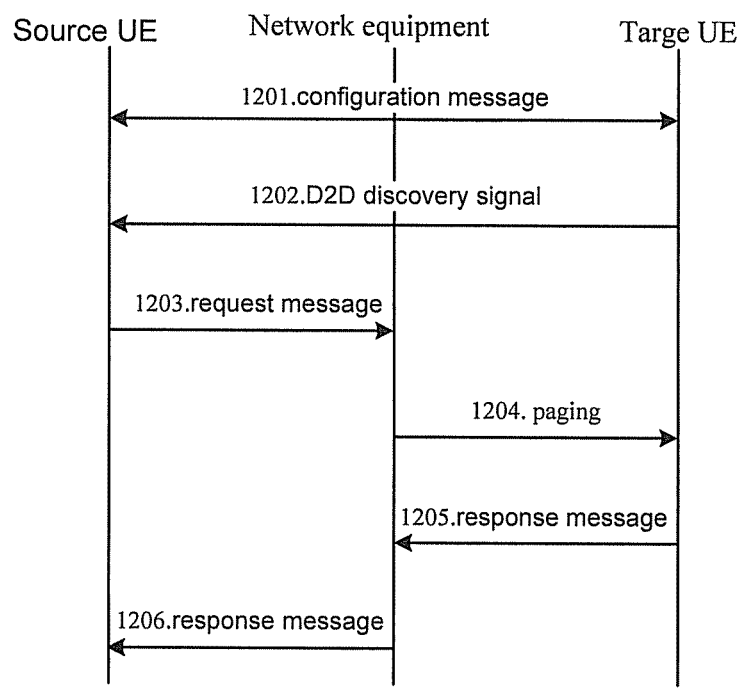
FIG. 12 is a diagram illustrating a signaling flow according to an embodiment 1.

FIG. 12 is a diagram illustrating the signaling flow of D2D peer discovery according to an embodiment 1. As shown in FIG. 12, in the embodiment, D2D peer discovery mainly includes the following steps:

Step S1201: a network equipment (equivalent to the foregoing network) transmits configuration message(s); the configuration message(s) indicating the configuration of peer discovery may include one or more of the following parameters: (1) a discovery signal set for indicating available D2D discovery signal(s); (2) resource configuration parameter(s) for indicating the sub-frame position and/or the resource block position where D2D discovery signal(s) can be transmitted.

The configuration message(s) may be sent by broadcasting. For example, the configuration message(s) is born in a System Information Block (SIB) and transmitted in the form of Radio Resource Control (RRC) signaling, and the SIB may be the original SIB in the system or a new SIB added for D2D communication.

In the embodiment, the network entity may be a base station, for example, an eNB defined by 3GPP which includes a Relay or other low-power nodes in the network. The network entity may further include other network units, for example, a Mobility Management Entity (MME) or other network units of a core network.

Step S1202: a D2D user equipment detects the foregoing configuration message(s). If the to be discovered function of the user equipment is activated, that is, the user equipment is set to be discoverable, then the user equipment can work as the target user equipment (equivalent to the foregoing second user equipment) shown in FIG. 12. For example, the user equipment transmits D2D discovery signal(s) in the peer discovery resource indicated by the configuration message(s).

If the user equipment has a peer discovery requirement, then the user equipment can work as the source user equipment (equivalent to the foregoing first user equipment) shown in FIG. 12. For example, the user equipment detects D2D discovery signal(s) in the peer discovery resource indicated by the configuration message(s).

The D2D discovery signal(s) may be the D2D discovery signal(s) indicated by the discovery signal set in the configuration message(s). Alternatively, target identifier information (ID) is carried in the D2D discovery signal(s), wherein the identifier may be a temporary identifier or an identifier acquired by the user equipment from a network for D2D communication or D2D communication peer discovery.

Step S1203: for the source user equipment, D2D discovery signal(s) being detected means that there is another discoverable user equipment in an adjacent area; the source user equipment requests for the identity of the target user equipment transmitting the D2D discovery signal(s) from the network based on the detected D2D discovery signal. For example, the source user equipment transmits a request message to the network entity. The identifier of the D2D discovery signal(s) detected by the source user equipment, for example, the sequence index of the D2D discovery signal(s), is included in the request message; and the request message may further include the resource position, for example, the sub-frame position and the resource block position, where the D2D discovery signal(s) is detected. Alternatively, the identification information in the D2D discovery signal(s) detected by the source user equipment is included in the peer discovery request.

Step S1204: after receiving the peer discovery request sent by the source user equipment, the network entity processes the request. For example, the network entity transmits paging message(s) in which the foregoing identifier of the D2D discovery signal(s) sent by the target user equipment is included, or the position of the transmission resource of the D2D discovery signal(s), for example, a sub-frame position and a resource block position, may also be included in the paging message(s). Alternatively, identifier information, that is, the identification information carried in the D2D discovery signal(s) detected by the source user equipment, is included, in the peer discovery request.

Step S1205: after transmitting the D2D discovery signal(s), the target user equipment monitors a paging channel; the target user equipment transmits a response message to the network entity after finding the identifier of D2D discovery signal(s) sent by itself in the paging channel, or finding the identifier of the D2D discovery signal(s) sent by itself and corresponding to D2D discovery signal(s) transmission resource which is the same as the D2D discovery signal(s) transmission resource of the target user equipment or after finding the foregoing identifier information. The response message represents whether or not the target user equipment allows to be discovered. When the target user equipment allows to be discovered, the response message may include the identity of the target user equipment. The identity may be an application layer identifier.

Further, before transmitting the response message, the network entity informs the target user equipment of the identity of the source user equipment, and the target user equipment determines whether or not to be discovered according to the identity of the source user equipment.

The paging channel may be a dedicated paging channel set for D2D communication or D2D peer discovery.

Step S1206: after receiving the response message sent by the target user equipment, the network entity transmits a response message to the source user equipment. The response message includes the identity of the target user equipment, or identification information representing that peer discovery is rejected is included in the response message when peer discovery is rejected.

After transmitting the peer discovery request, the source user equipment waits to receive a response message sent from the network entity and determines whether or not peer discovery is succeeded according to the content of the response message.

Further, if the source user equipment is in an idle (e.g. RRC idle) state when finding the D2D discovery signal(s), the source user equipment needs to initiate a connection establishment request first to establish a connection (e.g. an, RRC connection) with the network to enter into a connected state and then transmits a peer discovery request to the network.

Further, if the target user equipment is in an idle (e.g. RRC idle) state when finding the paging message(s), the target user equipment needs to initiate a connection establishment request first to establish a connection (e.g. an RRC connection) with the network to enter into a connected state and then transmits a response message to the network.

Embodiment 2

The embodiment is different from embodiment 1 in that in the embodiment, the source user equipment transmits D2D discovery triggering signal(s) before initiating a peer discovery request and the target user equipment transmits D2D discovery signal(s) after receiving the D2D discovery triggering signal(s).

Figure 13:
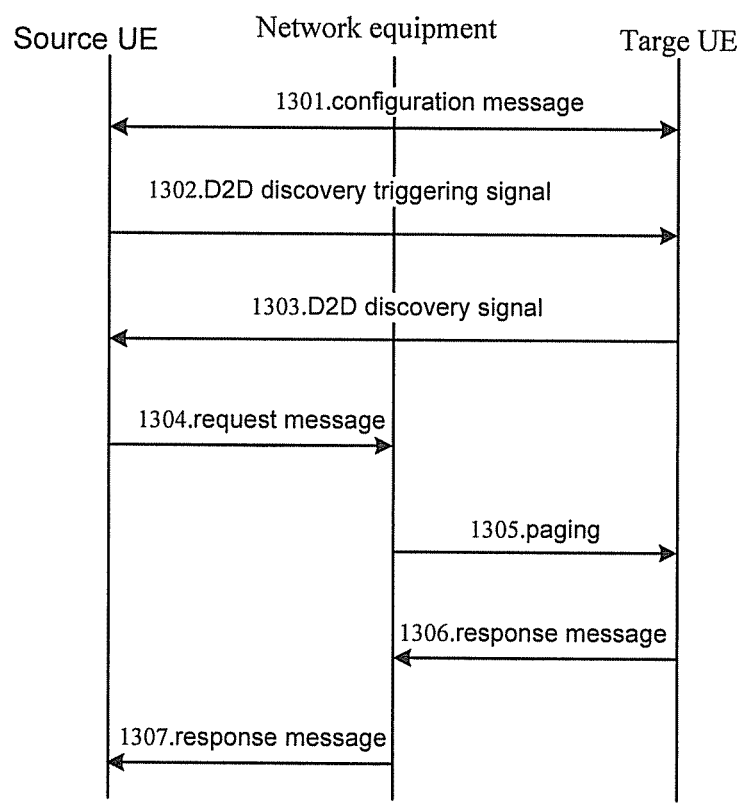
FIG. 13 is a diagram illustrating a signaling flow according to an embodiment 2.

FIG. 13 is a diagram illustrating the signaling flow of D2D peer discovery according to the embodiment, and as shown in FIG. 13, in the embodiment, D2D peer discovery mainly includes the following steps:

Step S1301: a network equipment (that is, the network) transmits configuration message(s) in which the configuration information about D2D discovery signal(s) and the configuration information about D2D discovery triggering signal(s) are contained; the configuration information of the D2D discovery signal(s) includes one or more of the following parameters: (1) a discovery signal set for indicating available D2D discovery signal(s); (2) resource configuration parameter(s) for indicating the sub-frame position and/or the resource block position used for the D2D discovery signal(s) transmission. The configuration information of the D2D discovery triggering signal(s) includes one or more of the following parameters: (1) D2D discovery triggering signal(s) set for indicating available D2D discovery triggering signals; (2) resource configuration parameter(s) for indicating the sub-frame position and/or the resource block position used for the D2D discovery signal(s) transmission Alternatively, resource configuration parameter(s) is included in the configuration message(s) to indicate the sub-frame position and/or the resource block position where the D2D discovery signal(s) and/or the D2D discovery triggering signal(s) are/is transmitted; and the configuration information of the D2D discovery triggering signal(s) is included in the configuration message(s) to indicate an available D2D discovery triggering signal set.

The configuration message(s) may be sent by broadcasting. For example, the configuration message(s) is born in an SIB which may be the original SIB in the system or a new SIB added for D2D communication.

In the embodiment, the network entity may be a base station, for example, an eNB defined by 3GPP which includes a Relay or other low-power nodes in the network. The network entity may further include other network units, for example, an MIME or other network units of a core network.

Step S1302: a D2D user equipment detects the foregoing configuration message(s). If the user equipment has a peer discovery requirement, then the user equipment can work as the source user equipment (that is, the foregoing first user equipment) shown in FIG. 13. For example, the D2D user equipment transmits D2D discovery triggering signal(s) in the D2D discovery triggering signal(s) resource indicated by the configuration message(s). After transmitting the D2D discovery triggering signal(s), the source user equipment monitors D2D discovery signal(s).

The peer discovery triggering signal may be a signal in the D2D discovery triggering signal(s) set indicated by the configuration message(s).

Step S1303: if the to-be-discovered function of the user equipment is activated, that is, the user equipment is set to be discoverable, then the user equipment can work as the target user equipment (equivalent to the foregoing second user equipment) shown in FIG. 13. For example, the D2D user equipment detects D2D discovery triggering signal(s) in the D2D discovery triggering signal(s) resource indicated by the configuration message(s). After detected the D2D discovery triggering signal(s), the user equipment transmits D2D discovery signal(s) in the D2D discovery signal(s).

The D2D discovery signal(s) may be the D2D discovery signal(s) indicated by the discovery signal set in the configuration message(s). Alternatively, target identifier is information (ID) is carried in the D2D discovery signal(s), wherein the identifier may be a temporary identifier or an identifier acquired by the user equipment from a network for D2D communication or D2D communication peer discovery.

Step S1304: for the source user equipment, the D2D discovery signal(s) being detected means that there is another discoverable user equipment in an adjacent area; the source user equipment requests for the identity of the target user equipment transmitting the D2D discovery signal(s) from the network based on the detected D2D discovery signal. For example, the source user equipment transmits a request message to the network entity. The identifier of the D2D discovery signal(s) detected by the source user equipment, for example, the sequence index of the D2D discovery signal(s), is included in the request message; and the request message may further include the resource position, for example, the sub-frame position and the resource block position, where the D2D discovery signal(s) is detected may also be included in the request message. Alternatively, the identification information in the D2D discovery signal(s) detected by the source user equipment is included in the peer discovery request.

Step S1305: after receiving the peer discovery request sent by the source user equipment, the network entity processes the request. For example, the network entity transmits paging message(s) in which the identifier (the foregoing identifier) of the D2D discovery signal(s) sent by the target user equipment is included, or the transmission resource position, for example, the sub-frame position and the resource block, position, of the D2D discovery signal(s) is also included in the paging message(s). Alternatively, identifier information, that is, the identification information carried in the D2D discovery signal(s) detected by the source user equipment, is included in the paging message(s).

Step S1306: after transmitting the D2D discovery signal(s), the target user equipment monitors a paging channel; the target user equipment transmits a response message to the network entity after finding the identifier of D2D discovery signal(s) sent by itself in the paging channel, or finding the identifier of D2D discovery signal(s) sent itself and corresponding to D2D discovery signal(s) transmission resource which is the same as the D2D discovery signal(s) transmission resource of the target user equipment or after finding the foregoing identifier information. The response message represents whether or not the target user equipment allows to be discovered. When the target user equipment allows to be discovered, the response message may include the identity of the target user equipment. The identity may be an application layer identifier.

Further, before transmitting the response message, the network entity informs the target user equipment of the identity of the source user equipment, and the target user equipment determines whether or not to be discovered according to the identity of the source user equipment.

The paging channel may be a dedicated paging channel set for D2D communication or D2D peer discovery.

Step S1307: after receiving the response message sent by the target user equipment, the network entity transmits a response message to the source user equipment. The response message contains the identity of the target user equipment, or identification information representing that peer discovery is rejected is included in the response message when peer discovery is rejected.

After transmitting the peer discovery request, the source user equipment waits to receive the response message sent from the network entity and determines whether or not peer discovery is succeeded according to the content of the response message.

Further, if the source user equipment is in an idle (e.g. RRC idle) state when finding the D2D discovery signal(s), the source user equipment needs to initiate a connection establishment request first to establish a connection (e.g. an RRC connection) with the network to enter into a connected state and then transmits a peer discovery request to the network.

Further, if the target user equipment is in an idle (e.g. RRC idle) state when finding the paging message(s), the target user equipment needs to initiate a connection establishment request first to establish a connection (e.g. an RRC connection) with the network to enter into a connected state and then transmits a response message to the network.

Compared with embodiment 1, D2D discovery triggering signal(s) is added in the embodiment, thus, power waste is reduced, for example, the target user equipment transmits no D2D discovery signal until after detected D2D discovery triggering signal(s).

Embodiment 3

Figure 14:
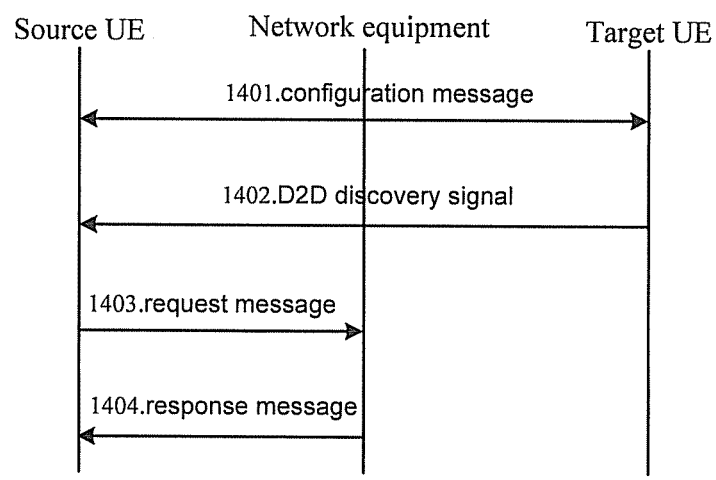
FIG. 14 is a diagram illustrating a signaling flow according to an embodiment 3.

FIG. 14 is a schematic diagram illustrating the signaling flow of D2D peer discovery according to the embodiment, and as shown in FIG. 14, in the embodiment, D2D peer discovery mainly includes the following steps:

Step S1401: a network equipment transmits configuration message(s); the configuration message(s) which indicates the configuration of D2D discovery signal(s) may include resource configuration parameter(s) indicating the sub-frame position and/or the resource block position where a D2 discovery, signal can be transmitted.

The configuration message(s) may be sent by broadcasting. For example, the configuration message(s) is born in an SIB which may be the original SIB in the system or a new SIB added for D2D communication.

In the embodiment, the network entity may be a base station, for example, an eNB defined by 3GPP which includes a Relay or other low-power nodes in the network. The network entity may further include other network units, for example, an MIME or other network units of a core network.

Step S1402: a D2D user equipment detects the foregoing configuration message(s); if the to-be-discovered function of the user equipment is activated, that is, the user equipment is set to be discoverable, then the user equipment can work as the target user equipment (equivalent to the foregoing second user equipment) shown in FIG. 14. For example, the user equipment transmits D2D discovery signal(s) in the peer discovery resource indicated by the configuration message(s).

If the user equipment has a peer discovery requirement, then the user equipment can work as the source user equipment (equivalent to the foregoing first user equipment) shown in FIG. 14. For example, the user equipment detects D2D discovery signal(s) in the peer discovery resource indicated by the configuration message(s).

Target identifier information (ID) is carried in the D2D discovery signal(s), wherein the identifier may be a temporary identifier or an identifier acquired by the user equipment from a network for D2D communication or D2D communication peer discovery.

Step S1403: for the source user equipment, the D2D discovery signal(s) being detected means that there is another discoverable user equipment in an adjacent area, and the source user equipment requests for the identity of the target user equipment transmitting the D2D discovery signal(s) from the network based on the detected D2D discovery signal. For example, the source user equipment transmits a request message to the network entity. The identification information in the D2D discovery signal(s) detected by the source user equipment is included in the request message.

Step S1405: after receiving the peer discovery request sent by the source user equipment, the network entity processes the request. For example, the network entity transmits a response message to the source user equipment, wherein the identity of the target user equipment is included in the response message, and the identity may be an application layer message.

Alternatively, the network entity determines whether or not the target user equipment can be discovered by the source user equipment according to a preset authority, if so, transmits a response message carrying the identity of the target user equipment to the source user equipment, otherwise, transmits a response message carrying rejection information to the source user equipment.

After transmitting the peer discovery request, the source user equipment waits to receive the response message sent from the network entity and determines whether or not peer discovery is succeeded according to the content of the response message.

Further, if the source user equipment is in an idle (e.g. RRC idle) state when finding the D2D discovery signal(s), the source user equipment needs to initiate a connection establishment request first to establish a connection (e.g. an RRC connection) with the network to enter into a connected state and then transmits a peer discovery request to the network.

Embodiment 4

The embodiment is different from embodiment 1 in that in the embodiment, the source user equipment transmits D2D discovery triggering signal(s) before initiating a peer discovery request and the target user equipment transmits D2D discovery signal(s) after receiving the D2D discovery triggering signal(s).

Figure 15:
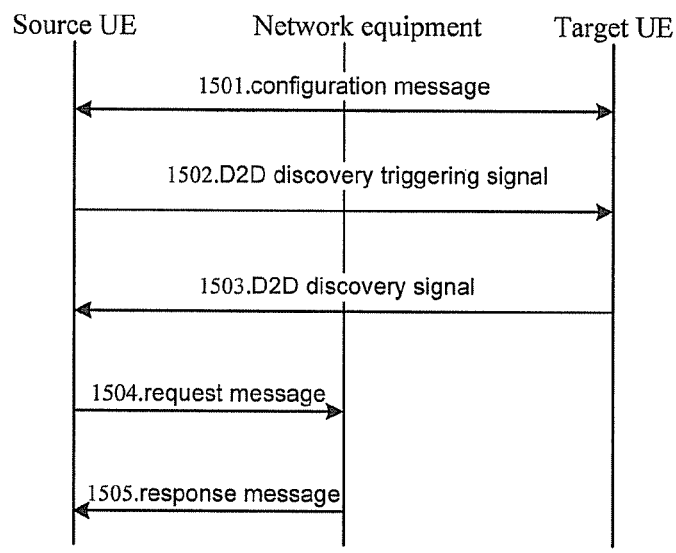
FIG. 15 is a diagram illustrating a signaling flow according to an embodiment 4.

FIG. 15 is a diagram illustrating the signaling flow of D2D peer discovery according to the embodiment, and as shown in FIG. 15, in the embodiment, D2D peer discovery mainly includes the following steps:

Step S1501: a network equipment transmits configuration message(s); the configuration message(s) which indicates the configuration of D2D discovery signal(s) may include resource configuration parameter(s) indicating the sub-frame position and/or the resource block position where a D2 discovery signal can be transmitted.

Further, the configuration message(s) includes resource configuration parameter(s) to indicate the sub-frame position and/or the resource block position used for the D2D discovery signal(s) transmission and the configuration information about D2D discovery triggering signal(s) to indicate an available D2D discovery triggering signal set.

Alternatively, the configuration message(s) includes resource configuration parameter(s) to indicate the sub-frame position and/or the resource block position where the D2D discovery signal(s) and/or the D2D discovery triggering signal(s) are/is transmitted and the configuration information of the D2D discovery triggering signal(s) to indicate an available D2D discovery triggering signal set.

The configuration message(s) may be sent by broadcasting. For example, the configuration message(s) is born in an SIB which may be the original SIB in the system or a new SIB added for D2D communication.

In the embodiment, the network entity may be a base station, for example, an eNB defined by 3GPP which includes a Relay or other low-power nodes in the network. The network entity may further include other network units, for example, an MIME or other network units of a core network.

Step S1502: a D2D user equipment detects the foregoing configuration message(s). If the user equipment has a peer discovery requirement, then the user equipment can work as the source user equipment (that is, the foregoing first user equipment) shown in FIG. 15. For example, the D2D user equipment transmits the D2D discovery triggering signal(s) in the peer discovery resource or the D2D discovery triggering signal(s) resource indicated by the configuration message(s) and if finding the D2D discovery triggering signal(s), transmits the D2D discovery signal(s) in the peer discovery resource.

Step S1503: if the to-be-discovered function of the user equipment is activated, that is, it is set that the user equipment can be discovered, then the user equipment can work as the target user equipment (equivalent to the foregoing second user equipment) shown in FIG. 15. For example, the D2D discovery triggering signal(s) is detected in the peer discovery resource or the D2D discovery triggering signal(s) resource indicated by the configuration message(s). If the D2D discovery triggering signal(s) is detected, then the D2D discovery signal(s) is sent in the peer discovery resource.

Target identifier information (ID) is carried in the D2D discovery signal(s), wherein the identifier may be a temporary identifier or an identifier acquired by the user equipment from a network for D2D communication or D2D communication peer is discovery.

Step S1504: after transmitting the D2D discovery triggering signal(s), the source user equipment waits to detect the D2D discovery signal(s). The D2D discovery signal(s) being detected means that there is another discoverable user equipment in an adjacent area, the source user equipment requests for the identity of the target user equipment transmitting the D2D discovery signal(s) from the network based on the detected D2D discovery signal. For example, the source user equipment transmits a request message to the network entity. The identification information in the D2D discovery signal(s) detected by the source user equipment is included in the request message.

Step S1505: after receiving the peer discovery request sent by the source user equipment, the network entity processes the request. For example, the network entity transmits a response message to the source user equipment, wherein the identity of the target user equipment is included in the response message, and the identity may be an application layer message.

Alternatively, the network entity determines whether or not the target user equipment can be discovered by the source user equipment according to a preset authority, if so, transmits a response message carrying the identity of the target user equipment to the source user equipment, otherwise, transmits a response message carrying rejection information to the source user equipment.

After transmitting the peer discovery request, the source user equipment waits to receive a response message sent from the network entity and determines whether or not peer discovery is succeeded according to the content of the response message.

Further, if the source user equipment is in an idle (e.g. RRC idle) state when finding the D2D discovery signal(s), the source user equipment needs to initiate a connection establishment request first to establish a connection (e.g. an RRC connection) with the network to enter into a connected state and then transmits a peer discovery request to the network.

Embodiment 5

A resource configuration method for peer discovery is described in the embodiment.

Figure 16:
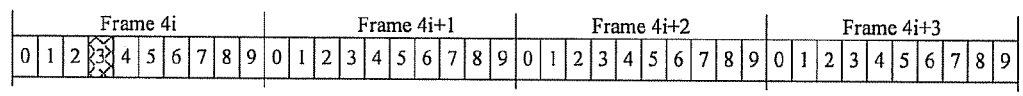
FIG. 16 is a schematic diagram illustrating the resource allocation for peer discovery according to embodiment 5.

The time-frequency resource used by the user equipment to transmit D2D discovery signal(s) may be a pre-reserved, resource. The pre-reserved resource refers to a part of time-frequency resource partitioned in a cellular communication system for D2D communication or the peer discovery during D2D communication, the UE can only transmit D2D discovery signal(s) and/or D2D discovery triggering signal(s) in the partitioned resource. For example, the pre-reserved resource is proportionally partitioned for D2D communication or the peer discovery during D2D communication. For example, one sub-frame is partitioned from each n radio frames in the time domain for the peer discovery in D2D communication, the one sub-frame may be appointed, for example, the sub-frame may be appointed to be sub-frame numbered by m and meeting the following condition: mod (SFN, n)=k, where k and m are both appointed integers, the value of k ranges from 0 to n−1, and the value of m ranges from 0-9. For example, when the value of n is 4, the value of k is 0 and the value of m is 3, the position of a D2D peer discovery sub-frame is shown by the sub-frame represented by ⊠ shown in FIG. 16.

Alternatively, the time-frequency resource used by the user equipment to transmit D2D discovery signal(s) may be a resource allocated by a network via high-layer signaling. For example, the network broadcasts the allocated peer discovery resource to the UE via a broadcast message such as system information, that is, the parameters n, k and m involved in the foregoing resource preservation mode are sent via a broadcast message, and the D2D user equipment acquires the configuration information of a D2D peer discovery time-frequency resource by detecting the broadcast message. Alternatively, the allocation of the time-frequency resource, that is, sub-frames, may be realized in a bitmap pattern, for example, a peer discovery sub-frame resource is allocated using a i-bit or 41-bit bitmap by taking one or four radio frames as an allocation period, wherein i is the number of the useable sub-frames in a radio frame, for example, i is 10 when a cellular communication uplink resource is used for peer discovery or 6 when a cellular communication downlink resource is used for peer discovery. Alternatively, the method for allocating a random access channel (RACH) resource in a 3GPP LTE/LTE-A system may be used to allocate a dedicated peer discovery resource to a D2D user equipment via high-layer signaling, the specific process is not repeatedly described in the embodiment.

The method for allocating a frequency-domain resource may be the resource allocation (RA) method used in a 3GPP LTE/LTE-A system, for example, resource allocation type 0, resource allocation type 1 and resource allocation type 2. Or the method for allocating a frequency-domain resource is the allocation method for an RACH frequency-domain resource which is not described here repeatedly.

In the embodiment, the RACH preamble defined by an LTE-LTE-A system is used as D2D discovery signal(s) and/or D2D discovery triggering signal(s). No related description is given here repeatedly.

It can be known from the above that aiming at the problem that D2D communication may share a frequency spectrum resource with cellular communication in a cellular communication system, the present disclosure effectively manages a D2D communication resource and harmonizes D2D communication with cellular communication by taking the potential interference of D2D communication on cellular communication into consideration during the peer discovery process of D2D communication. On the other hand, the flexibility and the resource consumption of peer discovery should be taken into consideration during the peer discovery process of D2D communication, that is, the user equipment should discover a peer autonomously without causing a high resource consumption or a great power waste.

Apparently, it should be appreciated by those skilled in the art that each module or step described in the invention can be realized by a universal computer and that the modules or steps may be integrated on a single computer or distributed on a network consisting of a plurality of computers, optionally, the modules or steps may be realized by executable program codes so that the modules or steps can be stored in a memory to be executed by a computer, and in some cases, the steps shown or described herein can be executed in a sequence different from this presented herein, or the modules or steps are formed into integrated circuit modules, or several of the modules or steps are formed into integrated circuit modules. Therefore, the present disclosure is not limited to the combination of specific hardware and software.

The mentioned above is only preferred embodiments of the invention but not limitation to the invention, it should be appreciated that various modification and variations can be devised by those of ordinary skill in the art. Any modification, substitute or improvement devised without departing from the spirit and scope of the present disclosure should fall within the protection range of the present disclosure.

What is claimed is:

1. A apparatus for Device-to-Device (D2D) communication, the apparatus located in a first user equipment, comprising:
    a first receiving module, configured to receive configuration message(s) from network, wherein configuration information about D2D discovery signal(s) is carried in the configuration message(s);
    a detection module, configured to detect D2D discovery signal(s) from a second user equipment according to the configuration information carried in the configuration message(s);
    a transmitting module, configured to transmit a request message to the network according to the detection of the detection module, wherein the request message is used to acquire the identity of the second user equipment transmitting the detected D2D discovery signal(s); and
    a second receiving module, configured to receive a response message sent from the network, wherein the identity of the second user equipment or rejection information indicating the rejection to the discovery of the second user equipment by the first user equipment is carried in the response message;
    wherein configuration information about D2D discovery triggering signal(s) is also carried in the configuration message(s); and the transmitting module is also configured to transmit the D2D discovery triggering signal(s) after the first receiving module receives the configuration message(s) and before the detection module detects the discovery signal, wherein the D2D discovery triggering signal(s) is used to trigger the second user equipment which receives the D2D discovery triggering signal(s) and has a peer discovery requirement to transmit the D2D discovery signal(s);
    wherein the configuration information of the D2D discovery triggering signal(s) comprises: a discovery triggering signal set indicating available D2D discovery triggering signals, and/or resource configuration parameter(s) indicating the time-domain sub-frame(s) and/or the frequency-domain resource block(s) used for the D2D discovery triggering signal(s) transmission.

2. The apparatus according to claim 1, wherein:
    identification information is carried in the D2D discovery signal(s), wherein the identification information for identifying the second user equipment is allocated by the network; and
    the identification information is carried in the request message to request for the identify information of the second user equipment corresponding to the identification information from the network.

3. The apparatus according to claim 1, wherein the identification information of the detected D2D discovery signal(s) is carried in the request message to request for the identity of the second user equipment transmitting the D2D discovery signal(s) from the network.

4. The apparatus according to claim 3, wherein the identification information of the D2D discovery signal(s) comprises the identifier of the D2D discovery signal(s) and/or the index of the resource transmitting the discovery signal, wherein the resource index is represented or determined by the time-domain sub-frame(s) and/or the frequency-domain resource block(s) used for the D2D discovery signal(s) transmission.

5. An apparatus for Device-to-Device (D2D) communication located in a second user equipment, comprising:
a receiving module, configured to receive configuration message(s) from a network, wherein the configuration information about D2D discovery signal(s) is carried in the configuration message(s); and
a transmitting module, configured to transmit the D2D discovery signal(s) according to the configuration information of the discovery signal;
wherein the configuration information about D2D discovery triggering signal(s) is also carried in the configuration message(s); and the apparatus further comprises:
a first detection module configured to detect the D2D discovery triggering signal(s) from a first user equipment according to the configuration information of the D2D discovery triggering signal(s) before the transmitting module transmits the D2D discovery signal(s) and to trigger the transmitting module to transmit the D2D discovery signal(s) after detected the D2D discovery triggering signal(s);
wherein the configuration information of the D2D discovery triggering signal(s) comprises: a discovery triggering signal set indicating available D2D discovery triggering signal(s), and/or resource configuration parameter(s) indicating the time-domain sub-frame(s) and/or the frequency-domain resource block(s) used for the D2D discovery triggering signal(s) transmission.

6. The apparatus according to claim 5, further comprising:
a third detection module configured to detect paging message(s) from the network, wherein the identification information of the D2D discovery signal(s) is carried in the paging message(s) to page the second user equipment transmitting the D2D discovery signal(s); and
the transmitting module is also configured to transmit a response message to the network, wherein the identify information of the second user equipment is carried in the response message, or rejection information indicating the rejection to the discovery of the second user equipment by the first user equipment is carried in the response message.

7. An apparatus for Device-to-Device (D2D) communication located at a network, comprising:
a first transmitting module, configured to transmit configuration message(s), wherein the configuration information about D2D discovery signal(s) is carried in the configuration message(s);
a detection module, configured to detect a request message from a first user equipment, wherein the request message is sent by the first user equipment according to a detected D2D discovery signal to request for the identity of the second user equipment transmitting the discovery signal; and
a second transmitting module, configured to transmit a response message to the first user equipment in response to the request message, wherein the identity of the second user equipment or rejection information indicating the rejection to the discovery of the second user equipment by the first user equipment is carried in the response message;
wherein configuration information about D2D discovery triggering signal(s) is also carried in the configuration message(s), wherein the configuration information of the D2D discovery triggering signal(s) comprises: a discovery triggering signal set indicating available D2D discovery triggering signals, and/or resource configuration parameter(s) indicating the time-domain sub-frame(s) and/or the frequency-domain resource block(s) used for the D2D discovery triggering signal(s) transmission.

8. The apparatus according to claim 7, wherein the identification information of the second user equipment is carried in the request message to request for the identify information of the second user equipment corresponding to the identification information; or the identification information of the D2D discovery signal(s) is carried in the request message to request for the identify information of the second user equipment transmitting the D2D discovery signal(s); wherein the identification information of the D2D discovery signal(s) comprises the identifier of the discovery signal and/or the index of the resource transmitting the discovery signal, wherein the resource index is represented or determined by the time-domain sub-frame(s) and/or the frequency-domain resource block(s) used for the D2D discovery signal(s) transmission.

9. The apparatus according to claim 8, further comprising:
a third transmitting module, configured to transmit paging message(s) for paging the second user equipment in response to the request message after the request message is detected by the detection module; a receiving module configured to receive a discovery response message sent from the second user equipment, wherein the identify information of the second user equipment or the rejection information is carried in the discovery response message; or
a determination module, configured to determine whether or not the second user equipment can be discovered by the first user equipment according to a preset authority configuration; an acquisition module configured to acquire the identity of the second user equipment corresponding to the identification information carried in the request message according to a preset correspondence between identification information and the identify information of user equipments if the determination result of the determination module is that the second user equipment can be discovered by the first user equipment, and a fourth transmitting module configured to transmit the response message carrying the identify information of the second user equipment to the first user equipment if the determination result of the determination module is that the second user equipment can be discovered by the first user equipment, or to transmit the response message carrying the rejection information to the first user equipment if the determination result of the determination module is that the second user equipment cannot be discovered by the first user equipment.

10. The apparatus according to claim 7, wherein the configuration message(s) is sent via high-layer signaling by broadcasting, and the configuration information of the D2D discovery signal(s) comprises: a discovery signal set indicating available D2D discovery signal(s), and/or resource configuration parameter(s) indicating the time-domain sub-frame(s) and/or the frequency-domain resource block(s) where the D2D discovery signal is transmitted.

11. A discovery method for Device-to-Device (D2D) communication, comprising:

receiving, by a first user equipment, configuration message(s) from a network, wherein the configuration information about D2D discovery signal(s) is carried in the configuration message(s);

detecting, by the first user equipment, D2D discovery signal(s) from a second user equipment according to the configuration information carried in the configuration message(s);

transmitting, by the first user equipment, a request message to the network according to the result of the detection to request to acquire the identity of the second user equipment transmitting the detected D2D discovery signal (s); and receiving, by the first user equipment, a response message returned from the network, wherein the identity of the second user equipment or rejection information indicating the rejection to the discovery of the second user equipment by the first user equipment is carried in the response message;

wherein configuration information about D2D discovery triggering signal(s) is also carried in the configuration message(s); and the transmitting module is also configured to transmit the D2D discovery triggering signal(s) after the first receiving module receives the configuration message(s) and before the detection module detects the discovery signal, wherein the D2D discovery triggering signal(s) is used to trigger the second user equipment which receives the D2D discovery triggering signal(s) and has a peer discovery requirement to transmit the D2D discovery signal(s);

wherein the configuration information of the D2D discovery triggering signal(s) comprises: a discovery triggering signal set indicating available D2D discovery triggering signals, and/or resource configuration parameter(s) indicating the time-domain sub-frame(s) and/or the frequency-domain resource block(s) used for the D2D discovery triggering signal(s) transmission.

12. The method according to claim 11, wherein the identification information of the second user equipment is carried in the D2D discovery signal(s), and the identification information is allocated by the network and carried in the request message to request for the identity of the second user equipment corresponding to the identification information from the network.

13. A method for Device-to-Device (D2D) communication, comprising:

receiving, by a second user equipment, configuration message(s) from a network, wherein the configuration information about D2D discovery signal(s) is carried in the configuration message(s); and transmitting, by the second user equipment, the D2D discovery signal(s) according to the configuration information of the D2D discovery signal(s);

wherein the configuration information of a D2D discovery triggering signal(s) is also carried in the configuration message(s); and the method further comprises:

before transmitting the D2D discovery signal(s), detecting, by the second user equipment, D2D discovery triggering signal(s) from a first user equipment according to the configuration information of the D2D discovery triggering signal(s), and sending, by the second user equipment, the D2D discovery signal(s) after detected the D2D discovery triggering signal(s);

wherein the configuration message is sent by broadcasting, and the configuration information of the D2D discovery signal(s) comprises: a discovery signal set indicating available D2D discovery signal(s), and/or resource configuration parameter(s) indicating the time-domain sub-frame(s) and/or the frequency-domain resource block(s) used for the D2D discovery signal transmission.

14. The method according to claim 13, wherein the identification information for identifying the second user equipment is carried in the D2D discovery signal(s), and the method further comprises:

detecting, by the second user equipment, paging message(s) from the network, wherein the identification information of the second user equipment is carried in the paging message(s) to page the second user equipment; and after detected the paging message(s), transmitting, by the second user equipment, a response message to the network, wherein the identify information of the second user equipment is carried in the response message, or rejection information indicating the rejection to the discovery of the second user equipment by the first user equipment is carried in the response message.

15. The method according to claim 13, further comprising:

detecting, by the second user equipment, paging message(s) from the network, wherein information of the D2D discovery signal(s) is carried in the paging message(s) to page the second user equipment transmitting the D2D discovery signal(s); and transmitting, by the second user equipment, a response message to the network, wherein the identify information of the second user equipment is carried in the response message, or rejection information indicating the rejection to the discovery of the second user equipment by the first user equipment is carried in the response message.

16. A method for Device-to-Device (D2D) communication, comprising:

transmitting, by a networks, configuration message(s), wherein the configuration information about D2D discovery signal(s) is carried in the configuration message(s);

detecting, by the network, a request message from a first user equipment, wherein the request message is sent by the first user equipment according to a detected D2D discovery signal to request for the identity of the second user equipment transmitting the discovery signal; and transmitting, by the network, a response message to the first user equipment in response to the request message, wherein the identity of the second user equipment or rejection information indicating the rejection to the discovery of the second user equipment by the first user equipment is carried in the response message;

wherein configuration information about D2D discovery triggering signal(s) is also carried in the configuration message(s), wherein the configuration information of the D2D discovery triggering signal(s) comprises: a discovery triggering signal set indicating available D2D discovery triggering signals, and/or resource configuration parameter(s) indicating the time-domain sub-frame(s) and/or the frequency-domain resource block(s) used for the D2D discovery triggering signal(s) transmission.

17. The method according to claim 16, wherein the identification information of the second user equipment is carried in the request message to request for the identify information of the second user equipment corresponding to the identification information.

18. The method according to claim 16, wherein the identification information of the D2D discovery signal(s) is carried in the request message to request for the identify information of the second user equipment transmitting the D2D discovery signal(s).

19. The method according to claim 18, further comprising:

transmitting, by the network, paging message(s) for paging the second user equipment in response to the request message after detected the request message, wherein the identity of the second user equipment or rejection information indicating the rejection to the discovery of the second user equipment by the first user equipment is carried in the response message; and determining, by the network, whether or not the second user equipment can be discovered by the first user equipment according to a preset authority configuration, if so, acquiring, by the network, the identify information of the second user equipment corresponding to the identification information carried in the request message according to a correspondence between identification information and the identify information of user equipments preset at the network and transmitting, by the network, the response message carrying the identify information of the second user equipment to the first user equipment, otherwise, transmitting, by the network, the response message carrying the rejection information to the first user equipment.

* * * * *